Feb. 17, 1931.    M. MAULER    1,793,411
TRACTOR WHEEL
Filed April 12, 1928
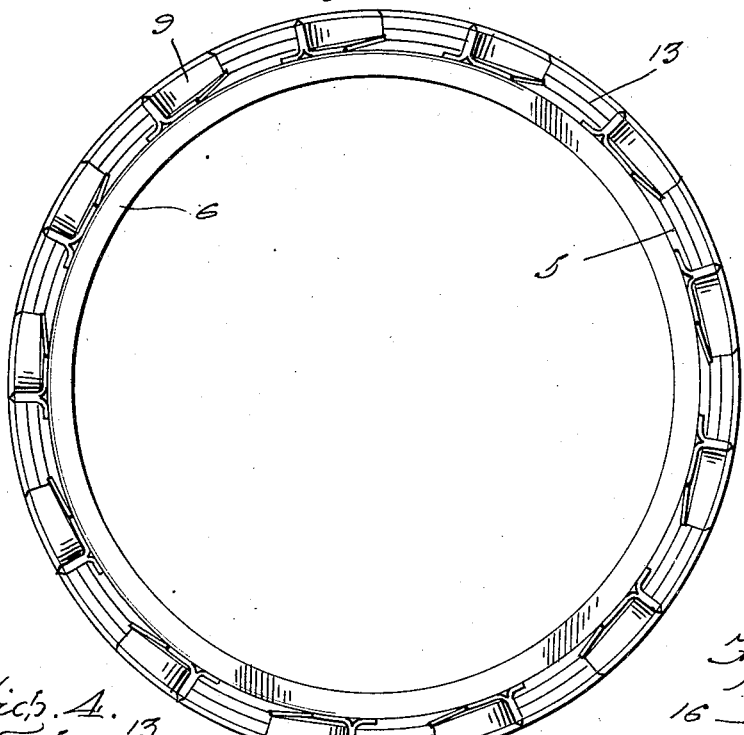
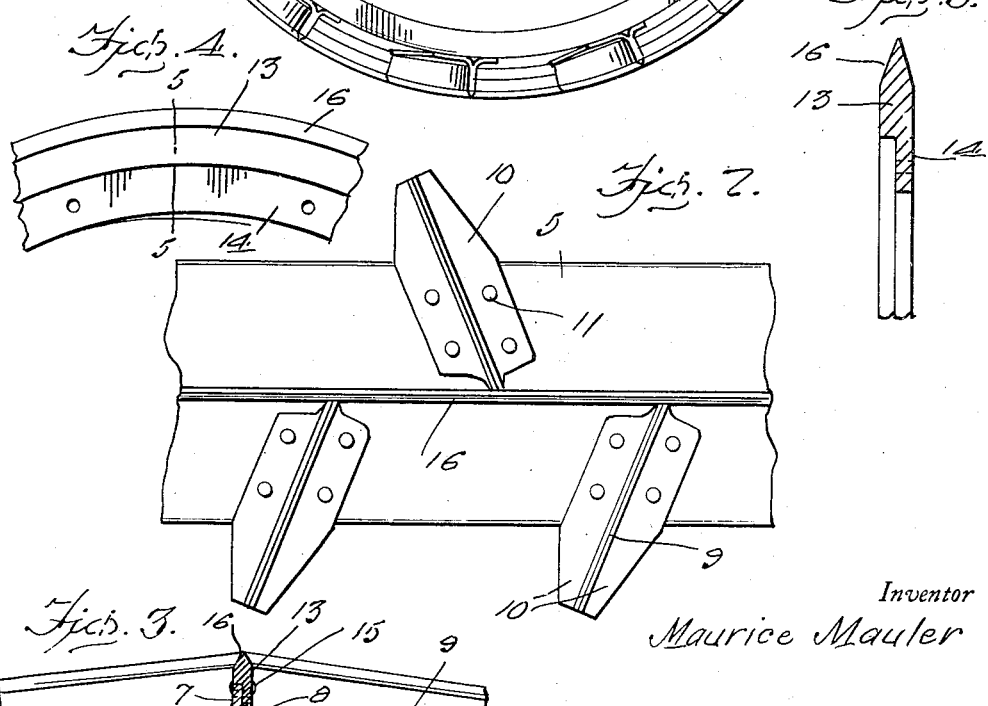
Inventor
Maurice Mauler
By Clarence A. O'Brien
Attorney Patented Feb. 17, 1931

1,793,411

UNITED STATES PATENT OFFICE

MAURICE MAULER, OF PLEASANTON, NEBRASKA

TRACTOR WHEEL

Application filed April 12, 1928. Serial No. 269,577.

The present invention relates to wheels for tractors and has for a principal object to construct a wheel of this character with a plurality of cleats extending from the center to the side edges of the rim of the wheel and also to provide a pronounced rib on the outer periphery at the center of the rim and extending outwardly from the rim a distance substantially equal to the cleats, whereby to prevent side slipping of the wheel during the operation of the tractor and also to provide for the smooth riding of the tractor over hard soil or pavements.

A further object of the invention is to arrange the cleats at a suitable angle, so that during the engagement of the cleats with the ground the soil will have a tendency to slip toward the side edges of the rim and in this manner aid in keeping the cleats free from an accumulation of the soil and thus insure the efficiency of the gripping action of the cleats.

A still further object is to provide a wheel of this character of a simple and practical construction, which is strong and durable, in which the cleats may be detachably mounted thereon, which is relatively inexpensive to manufacture, and otherwise well adapted for the purposes for which the same is intended.

Other objects and advantages reside in the special construction and combination of the various elements comprising the invention, reference being had to the accompanying drawings, forming a part hereof, wherein:

Figure 1 is a side elevational view of the rim of a tractor, constructed in accordance with my invention.

Figure 2 is a fragmentary plan view thereof.

Figure 3 is a transverse sectional view through the rim.

Figure 4 is a fragmentary view in elevation of the circumferentially extending rib.

Figure 5 is a transverse sectional view through the rib taken substantially along the line 5—5 of Figure 4.

Referring now to the drawing in detail, I have shown my invention comprising a tractor wheel rim composed of a pair of annular rim sections 5, having their outer edges provided with flanges 6, extending inwardly toward the hub of the wheel and with their inner abutting edges formed with outwardly extending flanges 7 and 7' respectively. As clearly illustrated in Figure 3 of the drawing, the flange 7 extends outwardly a slight distance beyond the flange 7', the flanges being secured to each other by means of rivets 8 or the like. To the outer surface of the rim sections is secured a plurality of cleats 9, said cleats each being formed of a section of plate material having one edge split and the parts on opposite sides of the split bent laterally and extending in opposite directions for forming a base 10 extending at right angles to the cleat.

The base 10 is secured to the rim sections by bolts or the like 11. The heads of the bolts are countersunk in the flanges of the cleats, with the opposite ends thereof extending through the rim sections and secured to the inner periphery of the rim by nuts 12. As clearly illustrated in Figure 2 of the drawings, the cleats 9 are inclined rearwardly so that the earth or material encountered by the wheel during the travelling thereof will have a tendency to slip toward the outer sides of the cleats or side edges of the rim, and in this manner assist in keeping the cleats clear from an accumulation of material. Seated upon the outer edge of the flange 7 of the rim section is an annular member 13, forming an outward extension for the flanges 7 and 7' and combining therewith to constitute a rib secured circumferentially about the rim at the center thereof. One side, at the inner periphery of the ring member 13 extends inwardly at a greater extent than the opposite side thereof, so as to compensate for the differences in length of the flanges 7 and 7', the longer flange 7 and the longer side of the ring member 13, designated at 14, thus being disposed in overlapping relation as clearly illustrated in Figure 3 of the drawings. The extension 14 is secured to the flange 7 by means of rivets 15 or the like.

The outer edge of the ring member 13 is bevelled as at each side, as shown at 16, whereby to form a substantial knife edge for the rib, the same being of a height substantially equal to the cleat 9. It will be apparent from the foregoing, that by constructing a tractor wheel in this manner, the same is susceptible of quantity production by making the bars separately and assembling them together. It is obvious that the invention is susceptible of various changes and modifications without departing from the spirit or scope of the invention or sacrificing any of its advantages.

Having thus described my invention, what I claim as new is:

A wheel rim comprising two sections having their adjacent edges formed into outwardly extending circumferential flanges and arranged for receiving bolts for securing said flanges together, one of said flanges extending outwardly from its section a greater distance than the other of said flanges, and an annular member seated upon the outer edges of said flanges, with one side thereof disposed in overlapping relation with respect to one of said flanges, and said overlapping parts having aligned openings formed therein to receive attaching bolts for securing the parts together.

In testimony whereof I affix my signature.

MAURICE MAULER.